(12) United States Patent
Nakane et al.

(10) Patent No.: US 9,062,214 B2
(45) Date of Patent: Jun. 23, 2015

(54) METHOD OF PREPARING RESIN COMPOSITION FOR HARD COAT AND RESIN COMPOSITION FOR HARD COAT

(75) Inventors: Asaki Nakane, Anjo (JP); Shigehiro Koide, Gamagori (JP); Yasuharu Yamada, Yokohama (JP)

(73) Assignee: NIDEK CO., LTD., Gamagori-shi (JP)

( * ) Notice: Subject to any disclaimer, the term of this patent is extended or adjusted under 35 U.S.C. 154(b) by 122 days.

(21) Appl. No.: 13/208,998

(22) Filed: Aug. 12, 2011

(65) Prior Publication Data

US 2013/0041063 A1 Feb. 14, 2013

(51) Int. Cl.
C08F 290/06 (2006.01)
C09D 7/12 (2006.01)
C09D 4/00 (2006.01)
C08G 83/00 (2006.01)
C08K 9/08 (2006.01)

(52) U.S. Cl.
CPC .. C09D 7/12 (2013.01); C09D 4/00 (2013.01); C08G 83/001 (2013.01); C09D 7/1225 (2013.01); C08K 9/08 (2013.01)

(58) Field of Classification Search
CPC ...... C09D 7/12; C09D 7/1208; C09D 7/1233; C09D 7/1225; C09D 4/06; C09D 4/00; C08G 83/001; C08K 9/08

USPC ........... 522/71, 74, 77, 79, 99, 142, 172, 183; 428/402, 403, 404, 405, 406, 407

See application file for complete search history.

(56) References Cited

U.S. PATENT DOCUMENTS

| | | | |
|---|---|---|---|
| 4,367,245 A * | 1/1983 | Kishida et al. | 427/515 |
| 6,348,537 B2 * | 2/2002 | Sugamoto et al. | 524/493 |
| 6,921,576 B2 * | 7/2005 | Terauchi et al. | 428/404 |
| 7,049,381 B2 * | 5/2006 | Gilles et al. | 526/273 |
| 7,622,514 B2 | 11/2009 | Liao et al. | |
| 2003/0129421 A1 | 7/2003 | Terauchi et al. | |
| 2010/0040823 A1 | 2/2010 | Hayashida et al. | |

FOREIGN PATENT DOCUMENTS

| | | |
|---|---|---|
| JP | A-2003-201444 | 7/2003 |
| JP | A-2004-277512 | 10/2004 |
| JP | A-2005-126453 | 5/2005 |
| JP | A-2009-83223 | 4/2009 |

* cited by examiner

*Primary Examiner* — Sanza McClendon
(74) *Attorney, Agent, or Firm* — Oliff PLC

(57) ABSTRACT

A method of preparing a resin composition for hard coat, comprises: a first step of obtaining a polyfunctional (meth) acrylate monomer modifying agent by addition reaction between a modifying agent having a thiol group and a three- or more functional (meth)acrylate monomer to form a covalent bond between the thiol group and acryloyl group and/or methacryloyl group, and a second step of modifying metal oxide microparticles with the polyfunctional (meth)acrylate monomer modifying agent that is obtained from the first step.

10 Claims, No Drawings

METHOD OF PREPARING RESIN COMPOSITION FOR HARD COAT AND RESIN COMPOSITION FOR HARD COAT

TECHNICAL FIELD

The present invention relates to a method of preparing a (meth)acrylic resin composition containing inorganic microparticles for hard coat and a resin composition for hard coat.

RELATED ART

For the purpose of improving mechanical properties and heat resistance, etc. of an acrylate resin such as polymethyl methacrylate (hereinafter referred to as PMMA), a resin composition blended with inorganic microparticles is known. As an example, there is known a resin composition obtained by sol-gel reaction of an acrylate polymer having an alkoxy silyl group and a metal alkoxide to have improved mechanical properties (see, JP-A-2004-277512). The resin composition can be, as a hard coat solution, coated on a resin substrate such as a plastic sheet, a plastic lens, and a plastic film to improve mechanical properties of the substrate. As an organic-inorganic coating solution for hard coat, a coating solution for hard coat composed of an organic resin matrix component and coated metal oxide microparticles that are coated with a polymer silane coupling agent is known (see, JP-A-2009-083223).

SUMMARY OF THE INVENTION

Problems to be Solved by the Invention

When coated on a resin substrate, the resin composition is expected to have a function of a hard coat.

In general, hard coat can improve mechanical properties such as scratch resistance and surface hardness. However, improving simultaneously both the mechanical properties and weather resistance is difficult to achieve. In many cases, the storage stability becomes an issue for an organic-inorganic coating solution for hard coat. In this connection, a resin composition which satisfies various performance requirements is waited for.

In view of the problems of the conventional techniques described above, the technical object of the invention is to provide a method of preparing a resin composition for hard coat which can satisfy mechanical properties such as scratch resistance and surface hardness or various performance requirements such as weather resistance and storage stability and a resin composition for hard coat that is obtained by the same method.

Means for Solving the Problems

As a result of intensive studies, inventors of the present invention found that an organic-inorganic hybrid resin composition containing metal oxide microparticles that are modified with a polyfunctional (meth)acrylate monomer modifying agent obtained by addition reaction between a modifying agent having a thiol group (a mercapto group) and a tri- or more functional (meth)acrylate monomer can be synthesized with a simple method, and as having good mechanical properties such as scratch resistance and surface hardness or good various performance requirements such as weather resistance and storage stability, it is particularly suitable to be used as a resin composition for hard coat.

According to the invention, as a modifying agent to be used, it is particularly suitable to use a silane coupling agent having a thiol group as represented by the general formula (1) below.

$$HS-(CH_2)_n-Si(R^1)_x(OR^2)_{3-x} \quad \text{Formula (1)}$$

($R^1$ and $R^2$ each independently represent a group selected from a lower alkyl group having 1 to 4 carbon atoms and a phenyl group. n is an integer of 1 to 11 representing the chain number of consecutive methylene groups and x represents 0, 1 or 2).

Examples of the silane coupling agent having a thiol group include 3-mercaptopropyl trimethoxy silane, 3-mercaptopropyl triethoxy silane, 3-mercaptopropylmethyl dimethoxy silane, 3-mercaptopropylethyl diethoxy silane, 1-mercaptomethylmethyl dimethoxy silane, and 11-mercaptoundecyl trimethoxy silane.

Further, as for the tri- or more functional (meth)acrylate monomer that is used in the invention, those described below can be used. Further, the term described as " . . . (meth)acrylate" indicates either " . . . acrylate" or " . . . methacrylate."

Examples of the tri- or more functional (meth)acrylate monomer include branched and cyclic (meth)acrylates and also urethane acrylates, such as trimethylol propane trimethacrylate, trimethylol propane triacrylate, ethylene oxide modified trimethylol propane triacrylate, pentaerythritol triacrylate, pentaerythritol tetraacrylate, dipentaerythritol hexaacrylate, tetramethylol methane triacrylate, tetramethylol methane tetraacrylate, and tris(2-hydroxyethyl)isocyanurate triacrylate, but not limited to those illustrated herein. Further, it can be used either singly or in combination of two or more.

Examples of the metal oxide microparticles to be used include silica ($SiO_2$), alumina ($Al_2O_3$), zirconia ($ZrO_2$), titania ($TiO_2$), ITO (indium tin oxide), tin oxide ($SnO_2$), zinc oxide (ZnO), antimony oxide ($Sb_2O_3$ and $Sb_2O_5$, etc.) and their complex microparticles. Further, these metal oxide microparticles have a hydroxyl group on their surface.

As for the particle diameter of the metal oxide microparticles that are used in the embodiment of the invention, average primary particle diameter is 100 nm or less, and preferably 30 nm or less. When the average primary particle diameter is 100 nm or less, characteristic transparency of a (meth)acrylate resin is maintained even after the resin composition for hard coat is cured by UV light.

The content of the metal oxide microparticles is, compared to the addition amount of the (tri- or more functional) (meth)acrylate monomer and the metal oxide microparticles having a hydroxyl group on the surface, preferably 20% by weight to 70% by weight, and more preferably 40% by weight to 60% by weight. When the metal oxide microparticles are less than 20% by weight, it is difficult for the microparticles to exhibit their effect. On the other hand, when it is more than 60% by weight, the resin composition obtained may easily become soft. Meanwhile, it is also possible to add metal alkoxide having high reactivity such as silicon, titanium, zirconium, and aluminum together with the metal oxide microparticles or add it instead of the metal oxide microparticles.

Further, by adding a bi- or less functional (meth)acrylate monomer or a fluoro resin to a resin composition containing the metal oxide microparticles that are modified with the polyfunctional (meth)acrylate monomer modifying agent, weather resistance and fastness (durability) and scratch resistance can be improved.

Examples of the bi- or less functional (meth)acrylate which can be used for the resin composition for hard coat of the invention include linear, branched and cyclic (meth)acrylates and also bi- or less functional urethane acrylates, such as methyl (meth)acrylate, n-butyl (meth)acrylate, 2-ethylhexyl (meth)acrylate, n-butoxyethyl (meth)acrylate, methoxy polyethylene glycol (meth)acrylate, benzyl (meth)acrylate, isobornyl (meth)acrylate, 2-hydroxyethyl (meth)acrylate, 2-hydroxypropyl (meth)acrylate, glycidyl (meth)acrylate, N-acryloyloxyethyl hexahydrophthalimide, glycerin di(meth)acrylate, 2-hydroxy 3-acryloylpropyl (meth)acrylate, tetrahydrofurfuryl (meth)acrylate, 2-hydroxybutyl (meth)acrylate, ethylene glycol di(meth)acrylate, 1,3-propylene glycol di(meth)acrylate, 1,4-heptanediol di(meth)acrylate, 1,6-hexanediol di(meth)acrylate, diethylene glycol di(meth)acrylate, tetraethylene glycol di(meth)acrylate, 2-butene-1,4-di(meth)acrylate, cyclohexane-1,4-dimethanol di(meth)acrylate, 1,5-pentane di(meth)acrylate, trimethylol ethane di(meth)acrylate, trimethylol propane di(meth)acrylate, dipropylene glycol di(meth)acrylate, 1,3-butylene glycol di(meth)acrylate, and dioxane glycol diacrylate, but not limited to those described herein. It can be used either singly or in combination of two or more. The content of the bi- or less functional (meth)acrylate monomer is, compared to the addition amount of the polyfunctional (tri- or more functional) (meth)acrylate monomer, preferably 30% by weight or less, and more preferably 10% by weight to 25% by weight. When the bi- or less functional (meth)acrylate monomer is more than 30% by weight, the coated film of the resin composition (i.e. hard coat layer) may easily become soft.

Examples of the fluoro resin which can be used for the resin composition for hard coat according to the invention include a fluorine based resin such as perfluoro polyether acrylate, perfluoro polyether methacrylate, polysiloxane containing fluorine, cyclic polysiloxane containing fluorine, cyclic polysiloxane acrylate containing fluorine, and cyclic polysiloxane methacrylate containing fluorine, but not limited thereto. Further, it may be used either singly or in combination of two or more.

In particular, a fluoro resin which is photo-curable and has excellent compatibility with a non-fluorine based organic compound is preferable. With addition of an extremely small amount thereof, scratch resistance can be improved.

Examples of the photopolymerization initiator for curing, with UV light, the resin composition for hard coat obtained include a triazine compound such as tris(chloromethyl)triazine, 2,4-trichloromethyl-(4'-methoxystyryl)-6-triazine, 2-[2-(furan-2-yl)ethenyl]-4,6-bis(trichloromethyl)-S-triazine, and 2,4,6-tris(trichloromethyl)-S-triazine; a benzoin compound such as benzoin methyl ether, benzoin ethyl ether, benzoin isopropyl ether, and benzoin butyl ether; an acetophenone compound such as diethoxyacetophenone, 4'-phenoxy-α,α-dichloroacetophenone, 2-benzyl-2-(dimethylamino)-1-(4-morpholinophenyl)-1-butanone, benzophenone, 2-hydroxy-2-methylpropiophenone, 1-hydroxycyclohexylphenyl ketone, and 1-hydroxycyclohexylacetophenone; a thioxantone compound such as thioxantone, 2-methylthioxantone, 2,4-dimethylthioxantone, and 2-chlorothioxantone; benzyldimethyl ketal, 2,4,6-trimethylbenzoin diphenyl phosphine oxide, N,N-dimethylamino isoamyl benzoate, and acyl phosphine oxide, and it may be used either singly or in combination of two or more. As for the addition amount, it is used in an amount of 10% by weight or less and preferably 0.5 to 5% by weight compared to the (meth)acrylate monomer.

Herein below, the method of preparing the resin composition of the invention will be explained.

First, to obtain the metal oxide microparticles that are modified with the polyfunctional (meth)acrylate monomer modifying agent, a modifying agent having a thiol group (i.e. a mercapto group) and a three- or more (meth)acrylate monomer are admixed with each other in a predetermined amount to produce a mixture.

For reacting the obtained mixture in an alkali condition, for example, a small amount of triethylamine is added and the reaction is carried out for a predetermined time at the temperature range of room temperature to 90° C. for addition reaction. According to the addition reaction in an alkali condition, the thiol group contained in the modifying agent and the acryloyl group and/or methacryloyl group contained in the three- or more functional (meth)acrylate monomer are covalently bonded (sulfide bond, —R—S—R'—: R and R' are an aliphatic and/or aromatic hydrocarbon chain) by Michael addition reaction to yield a polyfunctional (meth)acrylate monomer modifying agent.

According to the reaction, 1:1 addition reaction occurs between the thiol group contained in the modifying agent and the acryloyl group and/or methacryloyl group contained in the three- or more functional (meth)acrylate monomer as shown in the following reaction scheme 1. As a result, in the obtained polyfunctional (meth)acrylate monomer modifying agent, only an unreacted acryloyl group and/or methacryloyl group is present.

Further, with the sulfide bond obtained according to this reaction (i.e. —R—S—R'—: R and R' are an aliphatic and/or aromatic hydrocarbon chain), the resulting polyfunctional (meth)acrylate monomer modifying agent is given with flexibility.

[Chemical Formula 1]

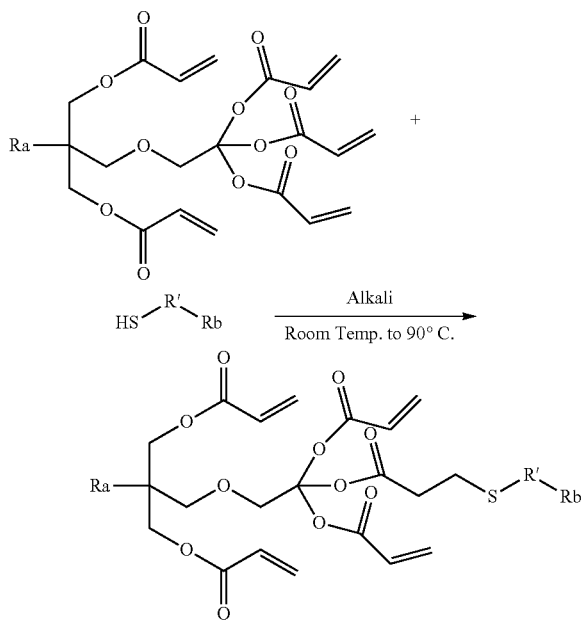

(wherein, Ra represents a residue of a polyfunctional (meth)acrylate monomer and Rb represents a residue of a modifying agent having a thiol group, respectively, and R' represents an aliphatic and/or aromatic hydrocarbon chain).

To the obtained polyfunctional (meth)acrylate monomer modifying agent, a predetermined amount of the metal oxide microparticles having a hydroxy group on the surface is added, wherein the microparticles are dispersed in an organic solvent. For promoting the condensation reaction between the polyfunctional (meth)acrylate monomer modifying agent and the metal oxide microparticles, alkali or acid diluted in water is added and stirred. With the reaction under stirring, a solution containing the metal oxide microparticles that are modified with the polyfunctional (meth)acrylate monomer modifying agent is obtained. By adding a predetermined amount of the polymerization initiator described above to the solution obtained, a desired resin composition for hard coat is obtained.

According to the invention, the number of hydroxy groups present on the surface of silica particle is 1.68 mmol/g (reference: Polymer, Volume 47, Issue 11, 2006, 3754-3759), and by calculating the percentage of the hydroxy groups on the surface of silica particle that are substituted with the polyfunctional (meth)acrylate monomer modifying agent, the modification ratio was determined.

If a surface modification ratio is too low, surface hardness and scratch resistance are deteriorated. On the other hand, if it is too high, storage stability of the resin composition is deteriorated. The surface modification ratio of the metal oxide microparticles is preferably within the range of 10 to 85%, and more preferably within the range of 40 to 65%.

To further improve scratch resistance, weather resistance or impact resistance, a bi- or less functional (meth)acrylate monomer or a fluoro resin is added at the time of adding a polymerization initiator. The amount of the bi- or less functional (meth)acrylate monomer used for the resin composition for hard coat according to the invention is, compared to the polyfunctional (tri- or more functional) (meth)acrylate monomer, preferably 30% by weight or less, and more preferably 10% by weight to 25% by weight. Further, the fluoro resin used for the resin composition for hard coat according to the invention is, compared to the total amount of the resin composition, 0.01 to 1% by weight.

If necessary, the resin composition for hard coat according to the invention may be suitably added with a photosensitizer, a leveling agent, an anti-foaming agent, a flowability modifying agent, a photostabilizer, an anti-oxidant, a coloring agent, and a pigment, etc.

The resin composition for hard coat according to the invention has a simple production process and it can be produced at low cost. By coating the resin composition for hard coat to a predetermined thickness on a substrate according to a spin coating, spray coating, dip coating, bar coating, flow coating, cap coating, knife coating, die coating, roll coating, gravure coating, screen printing, or brushing, etc. followed by photopolymerization and curing with UV irradiation, a hard coat layer having an effect of improving surface hardness and scratch resistance is formed on a substrate.

Further, by performing a corona discharge treatment or a plasma treatment, etc. on a substrate before coating with the resin composition for hard coat, adhesiveness between the hard coat layer and the substrate can be improved.

The resin composition for hard coat according to the invention is not limited to a PMMA resin sheet and it may be used for various sheets, films, and molding materials such as a polycarbonate resin, an acrylonitrile butadiene styrene resin, a vinyl chloride resin, a polycycloolefin resin, a polyethylene terephthalate resin, a polybutylene terephthalate resin, a triacetyl cellulose resin, a polyethylene resin, and a two- or three-layer resin in which the PMMA resin and polycarbonate resin each are laminated with each other, etc. In general, the sheet has a thickness of 0.3 to 100 mm, and the film has a thickness of 30 to 300 μm.

The film thickness of the hard coat layer is 1 to 50 μm, and preferably 1 to 20 μm. To form a film, UV irradiation is carried out with UV rays generated from a light source such as a low pressure mercury lamp, a high pressure mercury lamp, an ultrahigh pressure mercury lamp, an electrodeless lamp, a xenon lamp, a metal halide lamp, a carbon arc lamp, a LED lamp, and tungsten lamp.

It is also possible that the resin composition for hard coat according to the invention is coated on a substrate to form a hard coat layer and a known anti-reflective film is directly formed on the hard coat layer. As having good adhesiveness, no stripping occurs even when an anti-reflective film is directly formed on the hard coat layer. Further, the film characteristics (e.g., scratch resistance or surface hardness, etc.) of the resin composition for hard coat are not deteriorated even when an anti-reflective film is formed. Still further, by coating a known anti-fouling agent on a hard coat layer obtained by coating of the resin composition for hard coat according to the invention, a sliding property can be improved.

Effect of the Invention

With the resin composition for hard coat according to the invention, not only the high scratch resistance and high surface hardness (i.e. pencil hardness) are obtained but also weather resistance of a coating layer after film formation and storage stability as a hard coat solution can be satisfying.

BEST MODES FOR CARRYING OUT THE INVENTION

Herein below, the explanations are given with reference to the Examples and Comparative examples of the invention. However, the invention is clearly not limited by them.

Example 1

To 90 g of polyfunctional urethane acrylate monomer (trade name: UA-510H, manufactured by Kyoeisha Chemical Co., Ltd.), 6.42 g of 3-mercaptopropyl trimethoxysilane (trade name: KBM803, manufactured by Shin-Etsu Chemical Co., Ltd.) was added followed by addition of 0.408 g of triethylamine (manufactured by KISHIDA CHEMICAL Co., Ltd.). After heating at 70° C. for 2 hours, a polyfunctional (meth)acrylate monomer modifying agent was produced. The addition reaction was verified by NMR. To the polyfunctional (meth)acrylate monomer modifying agent, 300 g of silica particle dispersed MIBK (methyl isobutyl ketone) solution (trade name: MIBK-ST, manufactured by Nissan Chemical Industries, Ltd., $SiO_2$ 30% by weight, average particle diameter 10 to 20 nm) was added and stirred at room temperature. Thereafter, a mixture containing 21 g of methyl ethyl ketone and 2.64 g of pure water was added and stirred overnight at room temperature to produce a reaction solution containing silica particles that are modified with the polyfunctional urethane acrylate monomer modifying agent. After concentration using an evaporator to have the solid content of 55% by weight, the solution was filtered.

To the concentrated solution obtained from the above, 2.27 g of a photo radical polymerization initiator (trade name: IRGACURE 184, manufactured by Ciba Specialty Chemicals Inc.), 1.26 g of perfluoro polyether acrylate (trade name: AD-1700, manufactured by Solvay Solexis S.p.A.), and 11.65 g of bifunctional urethane acrylate (trade name: ARONIX M-1700, manufactured by TOAGOSEI Co., Ltd.) were added and stirred to produce a desired resin composition for hard coat (i.e. hard coat solution).

On a transparent PMMA substrate with 2 mm thickness (trade name: DELAGLAS, manufactured by ASAHI KASEI TECHNOPLUS Co., Ltd.), the hard coat solution obtained from the above was coated using a bar coater. Under an air atmosphere, the resulting substrate was irradiated with UV ray of about 900 mJ/cm$^2$ by using a high pressure mercury lamp to form a hard coat layer with film thickness of about 11 μm.

The hard coat layer on the PMMA plate as obtained from the above was evaluated by carrying out the following measurements and tests. The measurements and tests were carried out at least 24 hours after producing the hard coat layer. Further, the same measurements and tests were carried out for the Examples 2 to 14 and the Comparative example 1, and the results are shown in the Table 1.

[Pencil Hardness Test]

Pencil hardness was measured for the hard coat layer surface according to JIS-K-5600.

Specifically, a wooden part is removed from a pencil while keeping a cylindrical core intact so that 5 to 6 mm of the core remains. After that, the tip of the pencil core is made flat by using an abrasive paper. The tip of the pencil core is made flat by using an abrasive paper every time the test is carried out. In a tester, prescribed in HS, the pencil is placed. In the tester, the pencil is slid in a horizontal position so that the tip of the pencil is at an angle of 45±1° with respect to the coated surface and pressed with a load of 750±10 g.

After placing the tip of the pencil on the surface of a coated film, the tester was moved by 7 mm or more at a moving rate of 0.5 to 1 mm/s while applying the same load. The test site is switched to another site and the test is carried out with increasing pencil hardness until at least 3 mm or more scratch is formed. The strongest pencil hardness generating no scratch is taken as the pencil hardness of the test.

Pencil hardness is higher (harder) in the following order.

(soft) 6B•5B•4B•3B•2B•B•HB•F•H•2H•3H•4H•5H•6H (hard)

[Steel Wool Resistance Test]

When #0000 steel wool (trade name: BONSTAR, manufactured by BONSTAR SALES Co., Ltd.) is rubbed with load of 1.5 kg/cm$^2$, ten times, back and forth against the surface of the hard coat layer, the number of scratches generated was evaluated according to the following criteria.

The test was carried out with a stroke length of 10 cm and a rate of one back-and-forth rub stroke/second. The number of scratches within the 5 mm angle in which most scratches are shown was visually observed and counted.

0 scratch: A
No scratch but with cloudiness: AB
1 to 5 scratches: B
6 to 10 scratches: C
11 to 15 scratches: D
16 to 20 scratches: E
21 or more scratches: F

[Light Resistance Test]

The PMMA substrate coated with the hard coat solution was exposed up to 1000 hours at black panel temperature of 63° C. by using Super Xenon Weather Meter SX75 (trade name, manufactured by Suga Test Instruments Co., Ltd.). Thereafter, appearance after the test was evaluated.

[Heat Resistance Test]

The PMMA substrate coated with the hard coat solution was kept up to 1000 hours at constant temperature of 80° C. Then, appearance after the test was evaluated.

[Solution Stability]

50 ml of the hard coat solution was kept in a dark place at 50° C. Three months later, the state of the coat solution was observed and evaluated.

The results obtained therefrom are summarized in the Table 1.

A great amount of propylene glycol monomethyl ether (herein below, abbreviated as "PGM") was added to the resin composition for hard coat (i.e. hard coat solution) of the Example 1 followed by concentration using an evaporator. By repeating the same procedure, a resin composition for hard coat having PGM solvent was also obtained.

Example 2

By performing the same process as the Example 1 but until the concentration step, the solid content was adjusted to 55% by weight. 2.27 g of IRGACURE 184 was added and stirred to produce a hard coat solution. By using this hard coat solution, coating on a PMMA plate, measurement, test and evaluation were carried out in the same manner as the Example 1. The results obtained therefrom are shown in the Table 1.

Example 3

By performing the same process as the Example 1 but until the concentration step, the solid content was adjusted to 55% by weight. 2.27 g of IRGACURE 184 and 11.65 g of ARONIX M-1700 were added and stirred to produce a hard coat solution. By using this hard coat solution, coating on a PMMA plate, measurement, test and evaluation were carried out in the same manner as the Example 1. The results obtained therefrom are shown in the Table 1.

Example 4

By performing the same process as the Example 1 but until the concentration step, the solid content was adjusted to 55% by weight. 2.27 g of IRGACURE 184 and 1.26 g of AD-1700 were added and stirred to produce a hard coat solution. By using this hard coat solution, coating on a PMMA plate, measurement, test and evaluation were carried out in the same manner as the Example 1. The results obtained therefrom are shown in the Table 1.

Example 5

Similar to the Example 1, 6.42 g of KBM803 was added to 90 g of UA-510H, followed by addition of 0.408 g of triethylamine and heating at 70° C. for 2 hours. After the heating, the reaction solution was subjected to reduced pressure at 70° C. to remove the triethylamine. To the reaction solution, 300 g of MIBK-ST was added and stirred at room temperature. The mixture solution containing 21 g of methyl ethyl ketone and 2.64 g of 0.5% by weight aqueous acetic acid solution was added followed by stirring overnight at room temperature. After that, by performing the same process as the Example 1, the solid content was adjusted to 55% by weight. 2.27 g of IRGACURE 184 was added and stirred to produce a hard coat solution. By using this hard coat solution, coating on a PMMA plate, measurement, test and evaluation were carried out in the same manner as the Example 1. The results obtained therefrom are shown in the Table 1.

Example 6

A hard coat solution was produced in the same manner as the Example 2 except that 90 g of tetrafunctional urethane acrylate (trade name: EBECRYL 8210, manufactured by DAICEL-CYTEC Co., Ltd.) was used instead of UA-510H.

By using this hard coat solution, coating on a PMMA plate, measurement, test and evaluation were carried out in the same manner as the Example 1. The results obtained therefrom are shown in the Table 1.

Example 7

A hard coat solution was produced in the same manner as the Example 2 except that 90 g of pentaerythritol triacrylate (trade name: LIGHT-ACRYLATE PE-3A, manufactured by Kyoeisha Chemical Co., Ltd.) was used instead of UA-510H. By using this hard coat solution, coating on a PMMA plate, measurement, test and evaluation were carried out in the same manner as the Example 1. The results obtained therefrom are shown in the Table 1.

Example 8

A hard coat solution was produced in the same manner as the Example 1 except that 5.89 g of 3-mercaptopropylmethyl dimethoxy silane (trade name: KBM802, manufactured by Shin-Etsu Chemical Co., Ltd.) was used instead of KBM803. By using this hard coat solution, coating on a PMMA plate, measurement, test and evaluation were carried out in the same manner as the Example 1. The results obtained therefrom are shown in the Table 1.

Example 9

A hard coat solution was produced in the same manner as the Example 2 except that 72 g of UA-510H, 7.70 g of KBM803, 0.490 g of triethylamine, and 360 g of MIBK-ST were used. By using this hard coat solution, coating on a PMMA plate, measurement, test and evaluation were carried out in the same manner as the Example 1. The results obtained therefrom are shown in the Table 1.

Example 10

A hard coat solution was produced in the same manner as the Example 2 except that 108 g of UA-510H, 5.14 g of KBM803, 0.326 g of triethylamine, and 240 g of MIBK-ST were used. By using this hard coat solution, coating on a PMMA plate, measurement, test and evaluation were carried out in the same manner as the Example 1. The results obtained therefrom are shown in the Table 1.

Example 11

A hard coat solution was produced in the same manner as the Example 2 except that 3.21 g of KBM803 and 0.204 g of triethylamine were used. By using this hard coat solution, coating on a PMMA plate, measurement, test and evaluation were carried out in the same manner as the Example 1. The results obtained therefrom are shown in the Table 1.

Example 12

A hard coat solution was produced in the same manner as the Example 2 except that 12.48 g of KBM803 and 0.912 g of triethylamine were used. By using this hard coat solution, coating on a PMMA plate, measurement, test and evaluation were carried out in the same manner as the Example 1. The results obtained therefrom are shown in the Table 1.

Example 13

A hard coat solution was produced in the same manner as the Example 3 except that 11.65 g of monofunctional acrylate (trade name: ARONIX M-140, manufactured by TOAGOSEI Co., Ltd.) was used instead of ARONIX M-1700. By using this hard coat solution, coating on a PMMA plate, measurement, test and evaluation were carried out in the same manner as the Example 1. The results obtained therefrom are shown in the Table 1.

Example 14

A hard coat solution was produced in the same manner as the Example 1 except that 19.67 g of bifunctional urethane acrylate (trade name: EBECRYL 4858, manufactured by DAICEL-CYTEC Co., Ltd.) was used instead of ARONIX M-1700. On a transparent PMMA substrate with 1 mm thickness (trade name: DELAGLAS, manufactured by ASAHI KASEI TECHNOPLUS Co., Ltd.), the hard coat solution obtained was coated using a dip coater. Under an air atmosphere, the resulting substrate was irradiated with UV ray of about 600 mJ/cm$^2$ by using a high pressure mercury lamp to form a hard coat layer with film thickness of about 11 μm. The measurement, test and evaluation were carried out in the same manner as the Example 1. The results obtained therefrom are shown in the Table 1.

Comparative Example 1

A hard coat solution was produced in the same manner as the Example 2 except that 90 g of methyl methacrylate (trade name: LIGHT-ESTER M, manufactured by Kyoeisha Chemical Co., Ltd.) was used instead of UA-510H. By using this hard coat solution, coating on a PMMA plate, measurement, test and evaluation were carried out in the same manner as the Example 1. The results obtained therefrom are shown in the Table 1.

Comparative Example 2

90 g of UA-510H, 6.42 g of KBM803, 300 ml of tetrahydrofuran as a solvent and 0.245 g of azoisobutyronitrile (trade name: AIBN, manufactured by KISHIDA CHEMICAL Co., Ltd.) as a thermal polymerization initiator were added. After purging with nitrogen gas, heating was initiated at 70° C. Twenty minutes after the initiation of heating, the entire mixture was gellified. 1.5 of the gellified product was added to 20 g of acetone. After stirring for 24 hours, however, the product was not dissolved. The results obtained therefrom are shown in the Table 1.

TABLE 1

| | Silane | | | | Addition Agent | |
| --- | --- | --- | --- | --- | --- | --- |
| Example | Coupling Agent | (Meth)Acrylate Monomer | Alkali | Silica | Mono- or Bi-functional Monomer | Fluorine Resin |
| 1 | KBM803 6.42 g | UA-510H 90 g | Triethylamine 0.408 g | MIBK-ST 300 g | ARONIX M-1700 11.65 g | AD-1700 1.26 g |
| 2 | KBM803 | UA-510H | Triethylamine | MIBK-ST | None | None |

TABLE 1-continued

| | Silane Coupling Agent | (Meth)Acrylate Monomer | Alkali | Silica | Addition Agent Bi-functional Monomer | Fluorine Resin |
|---|---|---|---|---|---|---|
| 3 | KBM803 6.42 g | UA-510H 90 g | Triethylamine 0.408 g | MIBK-ST 300 g | ARONIX M-1700 11.65 g | None |
| 4 | KBM803 6.42 g | UA-510H 90 g | Triethylamine 0.408 g | MIBK-ST 300 g | None | AD-1700 1.26 g |
| 5 | KBM803 6.42 g | UA-510H 90 g | Triethylamine 0.408 g | MIBK-ST 300 g | None | None |
| 6 | KBM803 6.42 g | EBECRYL 8210 90 g | Triethylamine 0.408 g | MIBK-ST 300 g | None | None |
| 7 | KBM803 6.42 g | LIGHT-ACRYLATE PE-3A 90 g | Triethylamine 0.408 g | MIBK-ST 300 g | None | None |
| 8 | KBM802 5.89 g | UA-510H 90 g | Triethylamine 0.408 g | MIBK-ST 300 g | ARONIX M-1700 11.65 g | AD-1700 1.26 g |
| 9 | KBM803 7.70 g | UA-510H 72 g | Triethylamine 0.490 g | MIBK-ST 360 g | None | None |
| 10 | KBM803 5.14 g | UA-510H 108 g | Triethylamine 0.326 g | MIBK-ST 240 g | None | None |
| 11 | KBM803 3.21 g | UA-510H 90 g | Triethylamine 0.204 g | MIBK-ST 300 g | None | None |
| 12 | KBM803 12.48 g | UA-510H 90 g | Triethylamine 0.912 g | MIBK-ST 300 g | None | None |
| 13 | KBM803 6.42 g | UA-510H 90 g | Triethylamine 0.408 g | MIBK-ST 300 g | ARONIX M-140 11.65 g | None |
| 14 | KBM803 6.42 g | UA-510H 90 g | Triethylamine 0.408 g | MIBK-ST 300 g | EBECRYL 4858 19.67 g | AD-1700 1.26 g |

| Example | Pencil Hardness | Steel Wool Test | Light Resistance Test | Heat Resistance to 80° C. | Solution Stability 50° C. |
|---|---|---|---|---|---|
| 1 | 6H | A | No appearance change until 500 h | No appearance change until 500 h | No appearance change |
| 2 | 6H | AB | No appearance change until 500 h | No appearance change until 100 h | No appearance change |
| 3 | 6H | AB | No appearance change until 500 h | No appearance change until 500 h | No appearance change |
| 4 | 6H | A | No appearance change until 500 h | No appearance change until 100 h | No appearance change |
| 5 | 5H | AB | No appearance change until 500 h | No appearance change until 100 h | No appearance change |
| 6 | 5H | AB | No appearance change until 500 h | No appearance change until 100 h | No appearance change |
| 7 | 5H | AB | No appearance change until 100 h | No appearance change until 100 h | No appearance change |
| 8 | 6H | A | No appearance change until 500 h | No appearance change until 500 h | No appearance change |
| 9 | 6H | AB | No appearance change until 500 h | No appearance change until 100 h | No appearance change |
| 10 | 5H | AB | No appearance change until 500 h | No appearance change until 100 h | No appearance change |
| 11 | 5H | AB | No appearance change until 500 h | No appearance change until 100 h | No appearance change |
| 12 | 6H | AB | No appearance change until 500 h | No appearance change until 100 h | No appearance change |
| 13 | 6H | AB | No appearance change until 500 h | No appearance change until 500 h | No appearance change |
| 14 | 6H | A | No appearance change until 1000 h | No appearance change until 1000 h | No appearance change |

| Comp. Example | Silane Coupling Agent | (Meth)Acrylate Monomer | Alkali | Silica | Addition Agent Bi-functional Monomer | Fluorine Resin |
|---|---|---|---|---|---|---|
| 1 | KBM803 6.42 g | LIGHT-ESTER M 90 g | Triethylamine 0.408 g | MIBK-ST 300 g | None | None |
| 2 | KBM803 6.42 g | UA-510H 90 g | AIBN 0.150 g | Gelated | | |

| Comp. Example | Pencil Hardness | Steel Wool Test | Light Resistance Test | Heat Resistance to 80° C. | Solution Stability 50° C. |
|---|---|---|---|---|---|
| 1 | 2H | F | Not evaluated | Not evaluated | Not evaluated |
| 2 | — | — | — | — | — |

Further, the following test was performed for the hard coat layer on PMMA plate which has been obtained from the above (Examples 1, 2, 3, 4, 8, 13, and 14) and evaluation was made. The results obtained therefrom are shown in the Table 2. The measurements and tests were carried out at least 24 hours after producing the hard coat layer.

[Moisture Resistance Test]

The PMMA substrate coated with the hard coat was kept at constant temperature of 85° C. and humidity of 85% for 500 hours or 1000 hours. After the test, the appearance was evaluated.

[Thermal Cycle Test]

The PMMA substrate coated with the hard coat was subjected to ten repeating cycles of the treatment wherein each treatment cycle consists of 1 hour at −40° C. and 1 hour at 85° C. The appearance was evaluated thereafter.

[Drop Ball Test]

The PMMA substrate coated with the hard coat was fixed on a cylindrical aluminum jig, and then a steel ball (weight: 36 g, diameter: 13/16 inch) was allowed to fall freely from height of 20 cm onto the center. The appearance was evaluated thereafter.

TABLE 2

| | | | | Addition Agent | | | | | | | |
|---|---|---|---|---|---|---|---|---|---|---|---|
| Example | Silane Coupling Agent | (Meth) Acrylate Monomer | Alkali | Silica | Mono- or Bi-functional Monomer | Fluorine Resin | Pencil Hardness | Steel Wool Test | Moisture Resistance Test | Heat Cycle Test | Drop Ball Test |
| 1 | KBM803 6.42 g | UA-510H 90 g | Triethylamine 0.408 g | MIBK-ST 300 g | ARONIX M-1700 11.65 g | AD-1700 1.26 g | 6H | A | No appearance change until 120 h | No appearance change | No appearance change |
| 2 | KBM803 6.42 g | UA-510H 90 g | Triethylamine 0.408 g | MIBK-ST 300 g | None | None | 6H | AB | No appearance change until 60 h | No appearance change until 5 cycles | Small cracks occur, No breakage of substrate |
| 3 | KBM803 6.42 g | UA-510H 90 g | Triethylamine 0.408 g | MIBK-ST 300 g | ARONIX M-1700 11.65 g | None | 6H | AB | No appearance change until 120 h | No appearance change | No appearance change |
| 4 | KBM803 6.42 g | UA-510H 90 g | Triethylamine 0.408 g | MIBK-ST 300 g | None | AD-1700 1.26 g | 6H | A | No appearance change until 60 h | No appearance change until 5 cycles | Small cracks occur, No breakage of substrate |
| 8 | KBM802 5.89 g | UA-510H 90 g | Triethylamine 0.408 g | MIBK-ST 300 g | ARONIX M-1700 11.65 g | AD-1700 1.26 g | 6H | A | No appearance change until 120 h | No appearance change | No appearance change |
| 13 | KBM803 6.42 g | UA-510H 90 g | Triethylamine 0.408 g | MIBK-ST 300 g | ARONIX M-140 11.65 g | None | 6H | AB | No appearance change until 120 h | No appearance change | No appearance change |
| 14 | KBM803 6.42 g | UA-510H 90 g | Triethylamine 0.408 g | MIBK-ST 300 g | EBECRYL 4858 19.67 g | AD-1700 1.26 g | 6H | A | No appearance change until 120 h | No appearance change | No appearance change |

(Results)

As shown in the Table 1 and Table 2, the resin composition of the Examples 1 to 14 shows high scratch resistance and high surface hardness, and also it shows good weather resistance of a coating layer after film formation and good storage stability as a hard coat coating solution.

What is claimed is:

1. A method of preparing a resin composition for hard coat, comprising:
   a first step of obtaining a polyfunctional (meth)acrylate monomer modifying agent by addition reaction between a modifying agent having a thiol group and a three- or more functional (meth)acrylate monomer to form a covalent bond between the thiol group and acryloyl group and/or methacryloyl group,
   a second step of modifying metal oxide microparticles with the polyfunctional (meth)acrylate monomer modifying agent that is obtained from the first step, and
   a third step of adding a fluoro resin and a bi- or less functional (meth)acrylate monomer after the second step,
   the fluoro resin added in the third step being 0.01 to 1% by weight with respect to a total amount of the resin composition and the bi- or less functional (meth)acrylate monomer being present and 30% or less by weight with respect to the three- or more functional (meth)acrylate monomer.

2. The method of preparing a resin composition for hard coat according to claim 1, wherein the covalent bond in the first step is a sulfide bond being formed between the modifying agent having the thiol group and the three- or more functional (meth)acrylate monomer.

3. The method of preparing a resin composition for hard coat according to claim 2, wherein the modifying agent is a silane coupling agent having a thiol group.

4. The method of preparing a resin composition for hard coat according to claim 1, wherein the second step is performed in an alkali condition.

5. An organic-inorganic hybrid resin composition for hard coat including, as a hybrid material, metal oxide microparticles that are modified with a polyfunctional (meth)acrylate monomer modifying agent resulting from a sulfide bond, the sulfide bond being formed by bonding a thiol group of a silane coupling agent having a thiol group and an acryloyl group and/or methacryloyl group of a three- or more functional (meth)acrylate monomer, and
   further including, as a material composing the hybrid resin composition for a hard coat, a fluoro resin of 0.01 to 1% by weight with respect to a total amount of the resin composition and a bi- or less functional (meth)acrylate monomer of 30% or less by weight with respect to the three- or more functional (meth)acrylate monomer, wherein the bi- or less functional (meth)acrylate monomer is included.

6. The resin composition for hard coat according to claim 5, further including a photopolymerization initiator.

7. The method of preparing a resin composition for hard coat according to claim 2, wherein the second step is performed in an alkali condition.

8. The method of preparing a resin composition for hard coat according to claim 3, wherein the second step is performed in an alkali condition.

9. The method of preparing a resin composition for hard coat according to claim 2, wherein the sulfide bond is —R—S—R'—, and
R and R' independently comprise an aliphatic and/or an aromatic hydrocarbon chain.

10. The resin composition for hard coat according to claim 5, wherein the sulfide bond is —R—S—R'—, and
R and R' independently comprise an aliphatic and/or an aromatic hydrocarbon chain.

* * * * *